No. 736,971. Patented August 25, 1903.

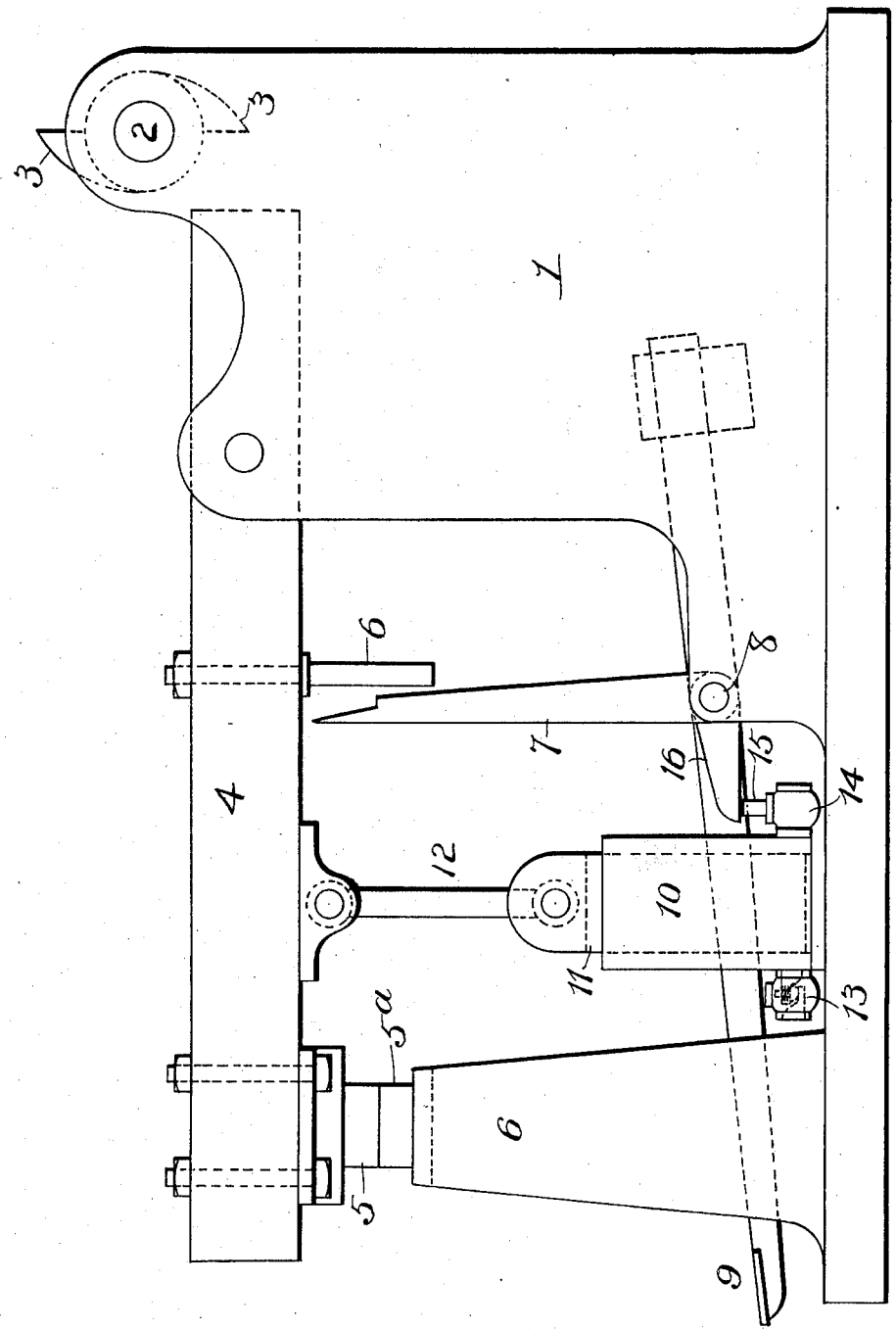

UNITED STATES PATENT OFFICE.

WILLIAM R. JENKINS, OF BELLEFONTE, PENNSYLVANIA.

POWER-HAMMER.

SPECIFICATION forming part of Letters Patent No. 736,971, dated August 25, 1903.

Application filed July 26, 1902. Serial No. 117,163. (No model.)

*To all whom it may concern:*

Be it known that I, WILLIAM R. JENKINS, a resident of Bellefonte, in the county of Center and State of Pennsylvania, have invented certain new and useful Improvements in Power-Hammers; and I do hereby declare the following to be a full, clear, and exact description of the invention, such as will enable others skilled in the art to which it appertains to make and use the same.

My invention relates to an improvement in power-hammers, the object of the invention being to provide means whereby the force of the blow or stroke of the hammer can be readily controlled and adjusted to the work in hand without any change in the speed of hammer being necessary, as is the case with power-hammers heretofore known.

With this object in view the invention consists in certain novel features of construction and combinations and arrangements of parts, as will be more fully hereinafter described, and pointed out in the claims.

The accompanying drawing is a side view illustrating my improvements.

1 represents a frame supporting the driving-shaft 2, on which is secured a cam 3 to engage one end of the helve 4, fulcrumed near one end in frame 1, as shown. The outer end of helve 4 carries a die 5 to engage a die $5^a$ on the anvil 6, and the helve is provided between its ends with a depending rod 6, to be engaged and held by a catch-up 7, secured on a shaft 8, supported in frame 1 and operated by a counterweighted treadle 9 to release the helve and permit it to fall when desired.

Between anvil 6 and frame 1 a cylinder 10 is located and provided with a plunger 11, connected with helve 4 by a link 12. One side of this cylinder 10 is provided at its lower end with an inlet check-valve 13, and an outlet-valve 14 is provided at its opposite side. This valve 14 is provided with a stem 15, operating to open the valve when depressed by an arm 16 on shaft 8, as will now be explained.

The operation of my improvements is as follows: In operation power being applied to shaft 2 the tappets of cam 3 striking the tail of the helve 4 operates to raise the forward end, with die 5 attached, and on the tappets passing off the end of the helve the forward end will fall by gravity and strike a blow of fixed force and will be constantly repeated at same strength of force if means to regulate the same are not provided. The plunger 11 being attached to the helve will rise and fall with it. On the upstroke the check-valve 13 will automatically open and admit air into cylinder 10 beneath plunger 11. On the completion of the upstroke valve 13 will close and prevent the escape of air confined in the cylinder, and on the downstroke the air confined will act as a cushion beneath the plunger, and thus prevent the helve from falling with the force it would if left free. When it is desired to increase the force of the blow, the treadle 9 is pressed down until arm 16 coming in contact with stem 15 of valve 14 opens the latter and permits the air in the cylinder to escape. It is obvious that by opening this valve 14 more or less the rapidity with which the air escapes can be governed and the force of the blow thereby controlled. The treadle 9 also operates the catch-up 7, the function of which is to catch the helve on its extreme upstroke and hold the same in this position until released by pressure on the treadle.

My improvements are applicable to power-hammers for ordinary use, but is especially adapted for power-hammers used in the manufacture of chain.

A great many slight changes might be made in the general form and arrangement of the several parts described without departing from my invention, and hence I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. In a power-hammer, the combination with a helve, of a cylinder, an automatically-operating inlet and a separate outlet valve at one end of the cylinder, a plunger in the cylinder connected with the helve so as to draw air into the cylinder when the helve rises and means for regulating the escape of air from the cylinder through the outlet-valve when the helve descends.

2. In a power-hammer the combination of means for pneumatically cushioning the stroke of the hammer, a catch-up for the hammer and means for simultaneously operating said catch-up and regulating the cushion of the stroke of the hammer at the will of the operator.

3. In a power-hammer, the combination with a helve, of means for raising the helve, a cylinder having an automatically-operating inlet check-valve at one end, a plunger in the cylinder connected with the helve, a separate outlet-valve at the same end of the cylinder as the check-valve to regulate the escape of air from the cylinder beneath the plunger, and a treadle for operating said last-mentioned valve.

4. In a power-hammer, the combination with a helve, a power-shaft, a cam thereon to raise the helve and to permit it to fall, a stationary die, and a die carried by the helve to fall thereon, of a cylinder below the helve, a plunger therein connected with the helve, an inlet check-valve near the bottom of the cylinder, an outlet-valve near the bottom of the cylinder having a protruding stem, a shaft, a catch-up thereon to hold the helve elevated, an arm on the shaft to engage the valve-stem, and a counterweighted treadle to operate said shaft.

In testimony whereof I have signed this specification in the presence of two subscribing witnesses.

WILLIAM R. JENKINS.

Witnesses:
CLEMENT DALE,
A. A. DALE.